United States Patent [19]

Blaiklock

[11] Patent Number: 5,224,274
[45] Date of Patent: Jul. 6, 1993

[54] CONTACT GAGE

[75] Inventor: William J. Blaiklock, Mystic, Conn.

[73] Assignee: The Edmunds Manufacturing Company, Farmington, Conn.

[21] Appl. No.: 850,048

[22] Filed: Mar. 12, 1992

[51] Int. Cl.⁵ .............................. G01B 7/12; G01B 5/12
[52] U.S. Cl. .............................. 33/544; 33/542; 33/544.3; 33/558.01; 33/783
[58] Field of Search .................. 33/544, 542, 544.3, 33/544.5, 542.1, 555.1, 558.01, 558.02, 558.2, 558.4, 783, 784, 792, 806, 807

[56] References Cited

U.S. PATENT DOCUMENTS

| | | | |
|---|---|---|---|
| 2,507,961 | 5/1950 | Chorlton | 33/544 |
| 2,553,397 | 5/1951 | Ames . | |
| 2,579,569 | 12/1951 | Hauck et al. . | |
| 2,716,284 | 8/1955 | Westberg | 33/558.01 |
| 3,384,969 | 5/1968 | Eisele | 33/542 |
| 3,821,856 | 7/1974 | Rapp | 33/544 |
| 3,958,338 | 5/1976 | Anichini et al. | 33/542 |
| 3,962,792 | 6/1976 | Stepanek et al. . | |
| 4,170,831 | 10/1979 | Olasz . | |
| 4,231,158 | 11/1980 | Possati . | |
| 4,238,886 | 12/1980 | Brown . | |
| 4,279,079 | 7/1981 | Gamberini et al. | 33/542 |
| 4,291,466 | 9/1981 | Bell et al. . | |
| 4,357,754 | 11/1982 | Kent . | |
| 4,386,467 | 6/1983 | Possati et al. | 33/542 |
| 4,419,829 | 12/1983 | Miller . | |
| 4,420,889 | 12/1983 | Possati et al. . | |
| 4,473,951 | 10/1984 | Golinelli et al. . | |
| 4,473,956 | 10/1984 | Voinescu . | |
| 4,493,153 | 1/1985 | Esken | 33/542 |
| 4,843,722 | 7/1989 | Sattman . | |
| 4,881,324 | 11/1989 | Khinchuk | 33/555.1 |
| 4,941,269 | 7/1990 | Mori et al. | 33/783 |
| 4,982,505 | 1/1991 | Pocci | 33/544 |

Primary Examiner—William A. Cuchlinski, Jr.
Assistant Examiner—C. W. Fulton
Attorney, Agent, or Firm—Chilton, Alix & Van Kirk

[57] ABSTRACT

A contact gage having a pair of elongated, pivotal gaging levers mounted in laterally spaced, side-by-side association and having lateral gaging contacts at the forward ends thereof. A V-shaped motion translation reed is mounted on and symmetrically between the rear ends of the gaging levers and has a central contact which moves linearly, perpendicular to the arc of relative pivotal movement of the gaging levers, to translate the relative pivotal movement of the gaging levers into linear movement of the central contact. The central contact is engaged by a linear pickup to detect the position of the contact and thereby detect the lateral distance between the gaging contacts.

19 Claims, 4 Drawing Sheets

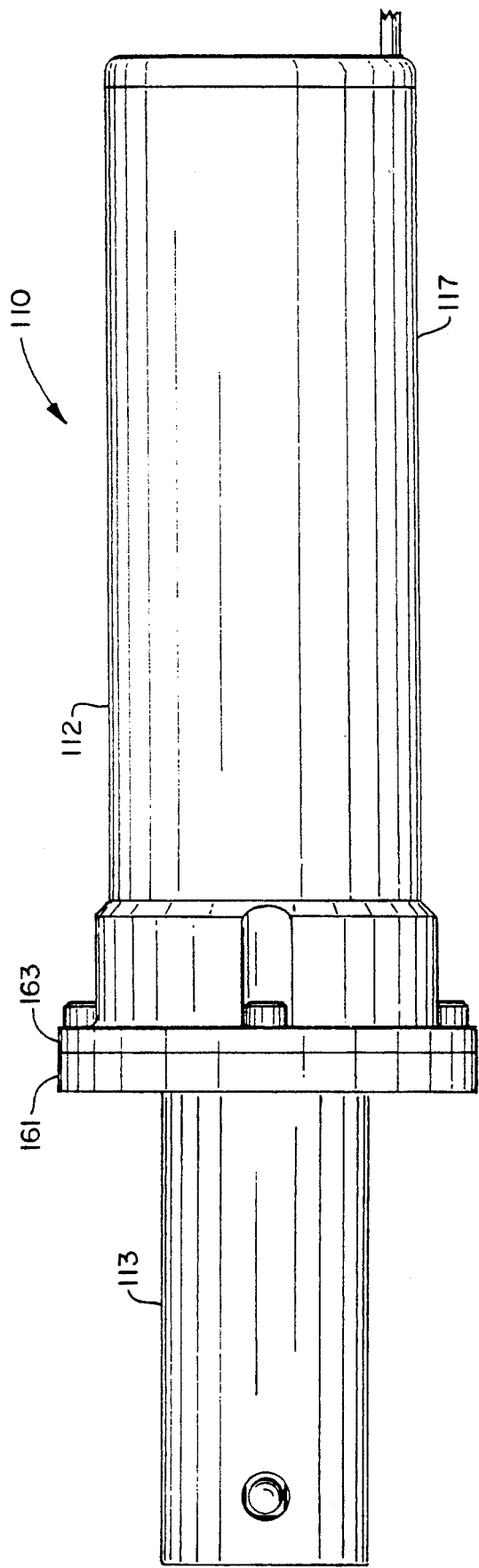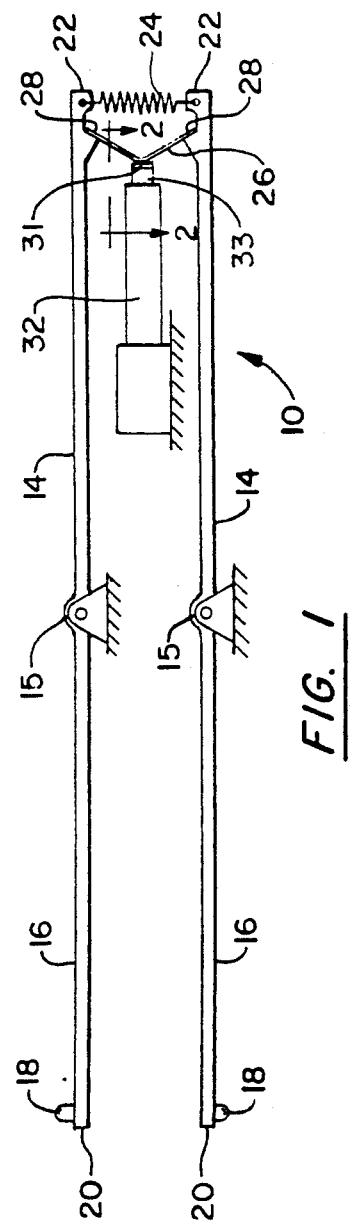

CONTACT GAGE

BACKGROUND AND SUMMARY OF THE INVENTION

The present invention relates generally to contact gages of the type having a pair of relatively movable contact arms for measuring an ID or OD of a workpiece.

A primary object of the invention is to provide in a contact gage of the type described, a new and improved system for translating the relative motion of the contact arms into linear motion without friction and attendant wear.

Another object of the invention is to provide a new and improved contact gage of the type described which can be calibrated to provide a highly accurate and reliable measurement and which retains its calibration over a long period of use.

A further object of the invention is to provide a new and improved contact gage of the type described which can be economically manufactured without use of precision ground parts.

Other objects will be in part obvious and in part pointed out more in detail hereinafter.

The invention accordingly consists of the features of construction, combination of elements and arrangement of parts exemplified by the embodiments hereinafter described.

BRIEF DESCRIPTION OF THE DRAWINGS

FIG. 1 is a generally diagrammatic illustration of a bore gage incorporating an embodiment of the invention;

FIG. 3 is a side view of a bore gage of the type diagrammatically illustrated in FIG. 1;

DETAILED DESCRIPTION OF THE PREFERRED EMBODIMENTS

Figure 4:
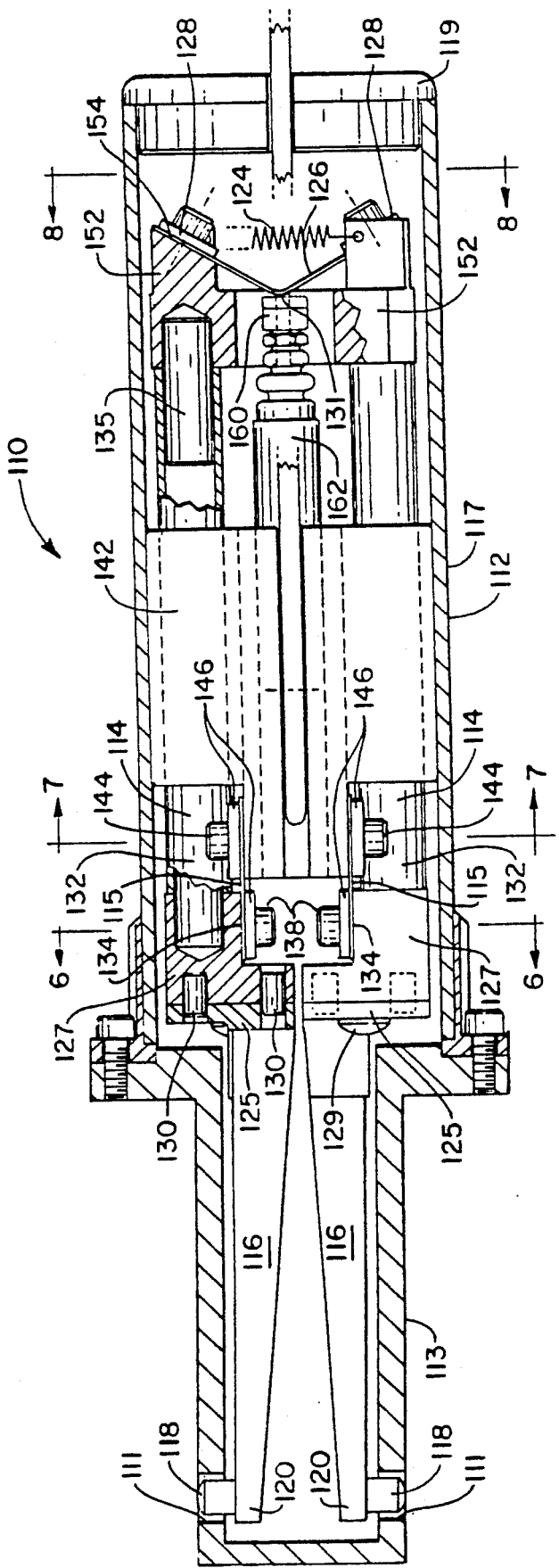
FIG. 4 is a longitudinal section view, partly broken away and partly in section, of the bore gage of FIG. 3.

Referring now to the drawings in detail wherein like numerals represent the same or like parts, a bore gage 10 incorporating an embodiment of the present invention is diagrammatically illustrated in FIG. 1. The bore gage 10 comprises a pair of elongated, rigid, gaging levers 14 mounted side-by-side in laterally spaced, generally parallel association. Each lever 14 has an intermediate pivot axis 15 and a front contact arm 16 with a gaging contact 18 at its front end 20. The gaging contacts 18 point laterally outwardly in opposite directions and have outer rounded ends adapted to engage the cylindrical surface of a workpiece bore. The rear ends 22 of the levers 14 are connected by a tension spring 24 to bias the gaging contacts 18 outwardly. If desired, one of the levers 14 may be fixed.

Figure 2:
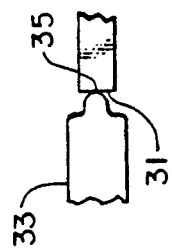
FIG. 2 is an enlarged partial longitudinal view of the bore gage of FIG. 1, taken generally along line 2—2 of FIG. 1.
Figure 7:
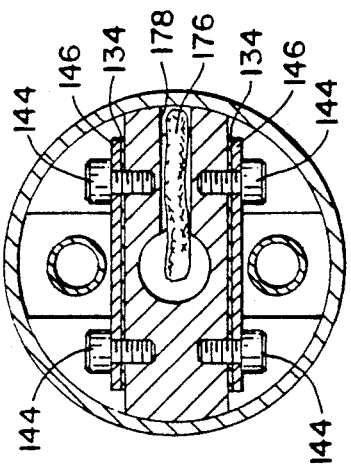
FIGS. 6-8 are transverse section views, partly in section, taken generally along lines 6—6, 7—7 and 8—8 respectively of FIG. 4.
Figure 6:
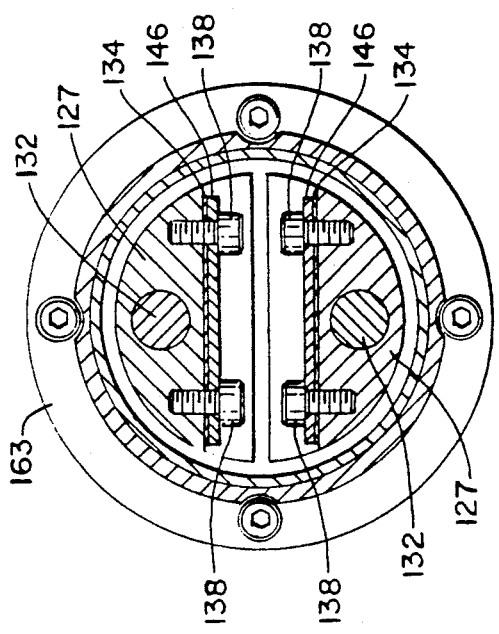
Figure 5:
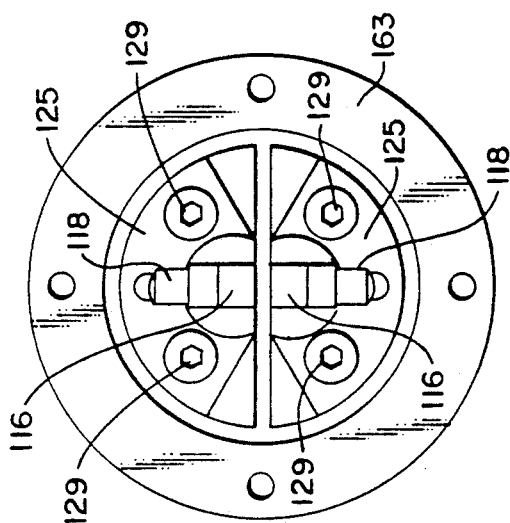
FIG. 5 is a front end view of the bore gage of FIG. 3 with parts removed.
Figure 8:
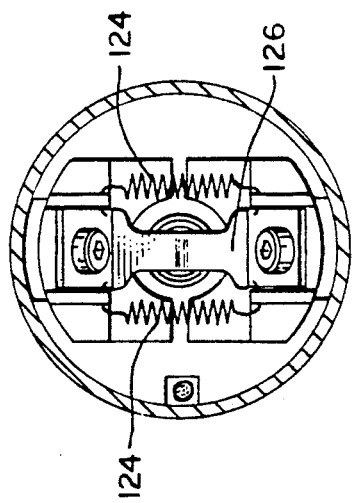

An elongated, V-shaped reed 26 is connected between the rear ends of the two levers 14. The reed 26 has a constant width of for example one-fourth inch. The two flat legs 28 of the reed 26 are secured to inclined, flat, rear end faces of the two gaging levers 14 so that the reed is symmetrically positioned between the two levers 14. A central nose or apex of the reed 26 provides a rounded, laterally extending edge which forms a reference contact 31 on the forward or convex side of the reed 26. The reference contact 31 moves generally parallel to the levers 14 and perpendicular to their arc of relative pivotal movement when the distance between the gaging contacts 18 changes. A linear pickup or detector 32 has a linear operating plunger 33 biased by a light internal spring (not shown) into engagement with the reference contact 31. As shown in FIG. 2, the rear end of the plunger 33 is formed with a raised, laterally extending, edge 35 similar and perpendicular to the contact edge 31 to provide approximately point engagement of the reed 26 and plunger 33. The linear pickup 32 follows and thereby detects the linear position of the reference contact 31. The linear pickup 32 provides an output signal of the linear position of its operating plunger 33 and is calibrated so that the output signal has a known predetermined correlation with the linear position of the reference contact 31 and thus the distance between the two gaging contacts 18. For example, the pickup 32 is a conventional, highly sensitive, linear variable differential transformer (LVDT) which translates the linear movement of its operating plunger 33 into an electrical signal which accurately represents the bore gage measurement.

The bore gage 10 operates in the following manner. The contact arms 16 are inserted into a workpiece bore with the contacts 18 in engagement with the bore surface. The diameter of the bore determines the relative pivotal positions of the levers 14 and thus the linear position of the reed contact 31. When the contacts 18 are properly positioned in the bore to measure the bore diameter, the output signal of the linear detector 32 provides an accurate reading of the bore diameter. Prior to use, the pickup 32 is suitably calibrated and preset by measuring a known diameter bore of a suitable master or standard part.

The structural details of an embodiment 110 of a bore gage of the type illustrated in FIG. 1 are shown in FIGS. 3-8. The bore gage 110 has an elongated housing 12 having a reduced, forwardly projecting plug body 113 and a rear, manually operable handle 117. The plug body 113 and handle 117 have cooperating flanges 161, 163 fastened together to permit the plug body 113 to be easily removed and replaced as desired. A pair of rigid gaging levers 114 are mounted side-by-side in laterally spaced, generally parallel association in the housing 112. Each gaging lever 114 has a forwardly projecting contact arm 116 with a laterally projecting gaging contact 118 at its forward end 120. The cylindrical plug body 113 encloses the front contact arms 116 and has apertures 111 through which the gaging contacts 118 protrude The handle 117 encloses substantially the remainder of the gaging levers 114 and has a flat rear end cap 119.

Each contact arm 116 has a generally semicircular support plate 125 at its rear end. The support plate 125 is secured by two machine screws 129 and two locating pins 130 to a center block 127 of the gaging lever 114. A rear arm of each gaging lever 114 is formed by a rear end lever block 152 and an elongated tube 132 connected to the center block 127 and rear end block 152 by internal pins 135. Each gaging lever 114 is mounted for pivotal movement within the housing 112 by a thin, flat, sheet metal reed 134. The reed 4 has one end secured to the center block 127 by two machine screws 138 and its other end secured to a fixed block 142 by two machine screws 144. Suitable fasteners (not shown) are provided for securing the fixed block 142 to the housing 112. Clamping plates 146 are employed to rigidly clamp the ends of the reed 134 to the two blocks 127, 142. A fixed pivot axis or fulcrum 115 is provided by a short, unsupported longitudinal section of the reed 134 between the clamping plates 146 to permit limited pivotal movement of the gaging lever 114.

The fixed block 142 has a coaxial bore receiving an LVDT cartridge or pickup 162. An electrical lead 176 extends forwardly from the cartridge 162 and radially outwardly and then rearwardly through a peripheral slot 178 in the fixed block 142.

The rear end block 152 of each gaging lever 114 has a flat rear face 154 inclined inwardly toward the other gaging lever 114. The two inclined faces 154 have an included angle of for example 130° for supporting an intermediate V-shaped actuating reed 126. The actuating reed 126 is stamped from suitable, spring tempered, shim stock having for example a thickness of 0.006 or 0.010 inches and then formed into the desired V-shape. The outer ends of the two flat legs 128 of the reed 126 are secured to the two inclined faces 154 by machine screws and clamping plates. The reed 126 is thereby mounted on and symmetrically positioned between the two gaging levers 114. The reed apex or contact 131 is engaged by a spring biased linear operating plunger 160 of the LVDT cartridge 162. The rear end blocks 152 are connected to each other by a pair of tension springs 124 to bias the gaging contacts 118 outwardly.

Figure 9:
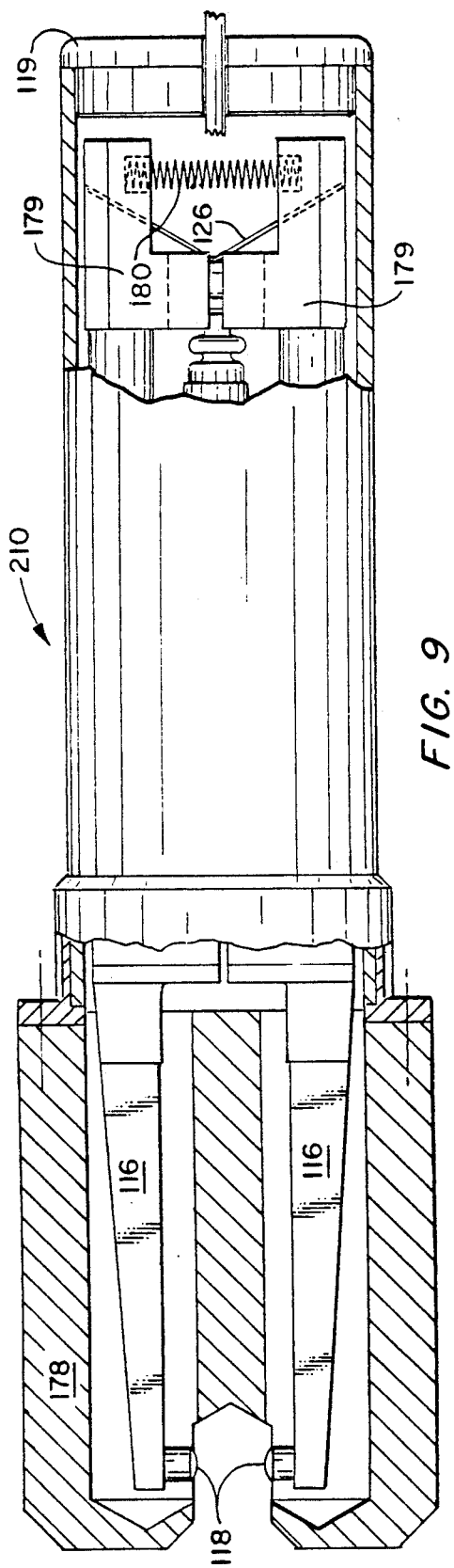
FIG. 9 is a side view, partly broken away and partly in section, of a snap gage incorporating another embodiment of the invention.
Figure 10:
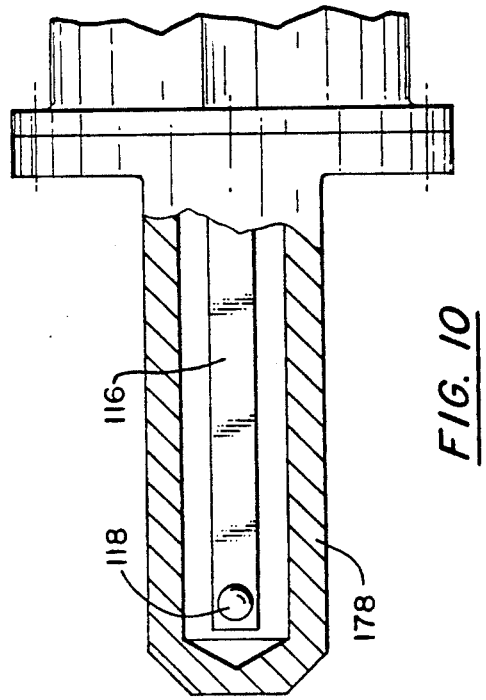
FIG. 10 is a partial longitudinal view, partly broken away and partly in section, of the snap gage.

FIGS. 9 and 10 show a snap gage embodiment 210 of the invention. The construction of the snap gage 210 is the same as the bore gage illustrated in FIGS. 3-8 except for the following few differences. Firstly, the contact arms 116 are mounted in a reverse position so that the gaging contacts 118 point laterally inwardly toward each other. Secondly, a front, yoke-type housing 178 is provided in place of the described plug body 113. Thirdly, modified rear end blocks 179 are provided which are connected by a pair of compression springs 180 which bias the gaging contacts 118 inwardly toward each other. Thus, the contact gage can be configured as a bore gage or snap gage merely by using the appropriate parts (i.e., front housing, rear end blocks and rear springs) and by installing the contact arms 116 in the appropriate manner.

Figure 11:
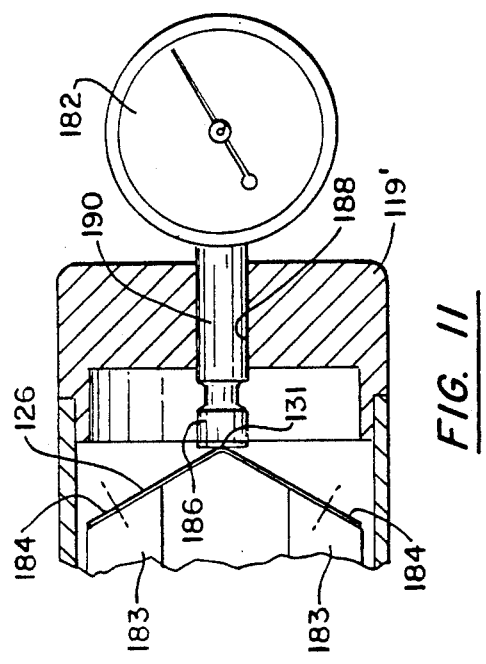
FIG. 11 is a partial longitudinal view, partly broken away and partly in section, of the rear end of a modified embodiment of the bore gage or snap gage.

FIG. 11 shows the back end of a contact gage 110 or 210 which has been modified to employ a dial indicator 182 in place of an LVDT cartridge 162. The actuating reed 126 is mounted so that its apex or contact 131 points rearwardly. The rear end blocks 183 have inclined, outwardly facing reed mounting faces 184 to accommodate this reverse orientation of the actuating reed 126. The indicator 182 has a linear operating plunger 186 biased into engagement with the reed contact 131 by an internal spring, not shown. A modified rear end cap 119, has a coaxial bore 188 for receiving an indicator support tube 190.

When a workpiece bore is measured, a bore gage 110 is used having a plug body diameter slightly less than the diameter of the workpiece bore. The plug body 113 is manually inserted into the bore so that the floating contacts 118 touch the opposite sides of the bore. As the contacts 118 move relative to each other, the included angle of the actuating reed 126 changes and the reed contact 131 moves perpendicular to the arc of relative pivotal movement of the gaging levers 114. Where an LVDT cartridge 162 is used, it produces an output signal representing the bore diameter. Where a dial indicator 182 is used, it provides a visual readout of any dimensional variation from a calibrated standard. The operation of the snap gage 210 is similar to the bore gage 110 except that the contacts 118 are employed to measure the outside diameter, thickness or other outside dimension of a workpiece.

In the preferred embodiment, the gaging levers 114 are dimensioned to provide approximately a 1:1 ratio between the relative movement of the gaging contacts 118 and the relative movement of the outer ends of the V-shaped reed 126. Also, the included angle of the V-shaped reed 126 is preferably within the range of 120°-140° and preferably about 130° to provide approximately a 1:1 ratio between the relative movement of the outer ends of the reed 126 and the linear movement of the reed contact 131. Other ratios and angles can be used which permit the LVDT cartridge 162 or dial indicator 182 to be calibrated to give the desired accuracy.

While the described configurations shown in FIGS. 1-11 are preferred, different configurations are contemplated. For example, the pivot axes can be provided at the rear ends of the gaging levers 114 and the actuating reed 126 can be mounted on and symmetrically between the gaging levers 114 at a point intermediate their pivot axes and gaging contacts 118 Also, preformed reeds having shapes other than the disclosed V-shape can be used.

The contact gages 110, 210 are preferably used for making precise measurements and for that reason provide for only very little movement of the gaging contacts 118 and actuating reed contact 131. Measurements accurate to within 10 to 20 millionths of an inch can be provided for each size gage within a range of approximately 20 thousands of an inch and with a linearity greater than ninety-eight percent (98%).

During a measurement with the gaging contacts 118 in engagement with a workpiece, the actuating reed contact 131 can move laterally slightly across the end of the linear operating plunger 160 or 186. This lateral movement is called "side shake". One of the advantages of the invention is that such "side shake" does not cause the reed contact 131 to move forwardly or rearwardly and therefore does not change the output signal or reading produced by the LVDT cartridge 162 or indicator 182. As can be seen, the actuating reed 126 provides for translating the relative pivotal movement of the gaging levers 114 into linear movement of the reed contact 131 in a manner which is substantially without friction and attendant wear.

As will be apparent to persons skilled in the art, various modifications and adaptations of the structure previously described will be readily apparent without departure from the spirit and scope of the invention.

What is claimed is:

1. A contact gage having first and second elongated gaging members with respective laterally spaced gaging contacts for lateral engagement with a workpiece, the gaging members being mounted for relative pivotal movement for relative lateral movement of the gaging contacts for varying the lateral distance therebetween, a generally V-shaped motion translation reed having first and second legs secured to the first and second gaging members respectively and an apex between the first and second legs forming a reference contact, the reed being operable to translate relative pivotal movement of the gaging levers into linear movement of the reference contact, and a linear pickup engaging the reference contact for measuring the linear position thereof and thereby measuring the lateral distance between the gaging contacts.

2. A contact gage according to claim 1, wherein the linear pickup is operable to generate a signal representing the linear position of the reference contact.

3. A contact gage according to claim 1, wherein each gaging member is pivotably mounted.

4. A contact gage according to claim 1, further comprising spring means connected between the gaging members to bias the relative pivotal movement of the gaging members in one relative pivotal direction thereof for biasing the gaging contacts into engagement with a workpiece.

5. A contact gage according to claim 3, wherein the gaging members have pivot axes located approximately centrally between the gaging contacts and legs of the motion translation reed.

6. A contact gage according to claim 1, wherein the motion translation reed is mounted symmetrically between the gaging members.

7. A contact gage according to claim 1, wherein the linear pickup is a linear variable differential transformer.

8. A contact gage according to claim 1, wherein the linear pickup is a dial indicator.

9. A contact gage according to claim 1, wherein the reference contact is positioned between the gaging members.

10. A contact gage according to claim 1, wherein the elongated gaging members are mounted in laterally spaced side-by-side association.

11. A contact gage according to claim 10, further comprising a fixed mounting block between the gaging members, a first flexure reed for pivotally connecting the first gaging member to the mounting block, and a second flexure reed for pivotally connecting the second gaging member to the mounting block.

12. A contact gage according to claim 1, wherein the V-shaped has an included angle within the range of 120–140 degrees.

13. A contact gage according to claim 12, wherein the V-shaped reed has an included angle of about 130 degrees.

14. A contact gage according to claim 3, wherein the gaging members have pivot axes between the gaging contacts and motion translation reed.

15. A contact gage according to claim 1, wherein each gaging member has a gaging arm mounting block, a forwardly projecting gaging arm supporting a respective gaging contact and having a rear mounting plate adapted to be mounted in reverse positions thereof on the gaging arm mounting block to point the respective gaging contact in opposite lateral directions thereof for adapting the contact gage for use as a bore gage or snap gage.

16. A contact gage comprising first and second elongated gaging members with respective laterally spaced gaging contacts for lateral engagement with a workpiece, the gaging members being mounted for relative pivotal movement for relative lateral movement of the gaging contacts for varying the lateral distance therebetween, a motion translation reed having a reference contact and first and second legs connected to the first and second gaging members respectively and operable to translate relative pivotal movement of the gaging levers into linear movement of the reference contact, and a linear pickup engaging the reference contact for measuring the linear position thereof and thereby measuring the lateral distance between the gaging contacts, wherein each of the gaging members has a pivot axis located between the gaging contact and the connection between the motion translation reed and the gaging member.

17. A contact gage according to claim 16, wherein the linear pickup is operable to generate a signal representing the linear position of the reference contact.

18. A contact gage according to claim 16, wherein the motion translation reed is generally V-shaped.

19. A contact gage according to claim 16, wherein the motion translation reed is mounted symmetrically between the gaging members.

* * * * *